United States Patent [19]

Kohama et al.

[11] Patent Number: 4,734,243
[45] Date of Patent: Mar. 29, 1988

[54] INJECTION MOLDING MACHINE AND METHOD

[75] Inventors: Tadahiko Kohama, Nishio; Susumu Shibata, Okazaki; Shogo Izawa, Tokai; Takami Noda, Nagoya; Atsuo Teraoka, Hiroshima, all of Japan

[73] Assignees: Aisin Seiki Kabushiki Kaisha, Kariya; The Japan Steel Works, Ltd., Tokyo, both of Japan

[21] Appl. No.: 889,473

[22] Filed: Jul. 25, 1986

[30] Foreign Application Priority Data

Jul. 25, 1985 [JP] Japan ................................. 60-165477

[51] Int. Cl.⁴ .............................................. B25B 7/00
[52] U.S. Cl. ............................ 264/328.8; 264/328.14; 425/547; 425/574; 425/581; 425/588
[58] Field of Search ............... 425/542, 547, 559–564, 425/566, 567, 572, 570, 574, 581, 585–588; 264/328.8, 328.14, 328.15

[56] References Cited

U.S. PATENT DOCUMENTS

| | | | |
|---|---|---|---|
| 2,080,783 | 5/1937 | Peterson | 425/547 |
| 3,611,503 | 10/1971 | Blumer | 425/578 |
| 3,861,841 | 1/1975 | Hanning | 425/563 |
| 4,389,358 | 6/1983 | Hendry | 425/560 |
| 4,473,516 | 9/1984 | Hunnerberg | 425/562 |
| 4,632,651 | 12/1986 | Ohe et al. | 425/542 |

Primary Examiner—Bernard Nozick
Attorney, Agent, or Firm—Oblon, Fisher, Spivak, McClelland & Maier

[57] ABSTRACT

An injection molding machine for plastics and any other similar materials. This invention molding machine is provided with a plasticization device for exclusive use which consecutively plasticizes material and feeds plasticized material to a plurality of injection devices in regular sequence. Each of the injection devices has its corresponding mold clamping device. By virtue of this construction, working efficiency of main sections of the machine is increased, resulting in a higher productivity of the entire injection molding machine.

3 Claims, 5 Drawing Figures

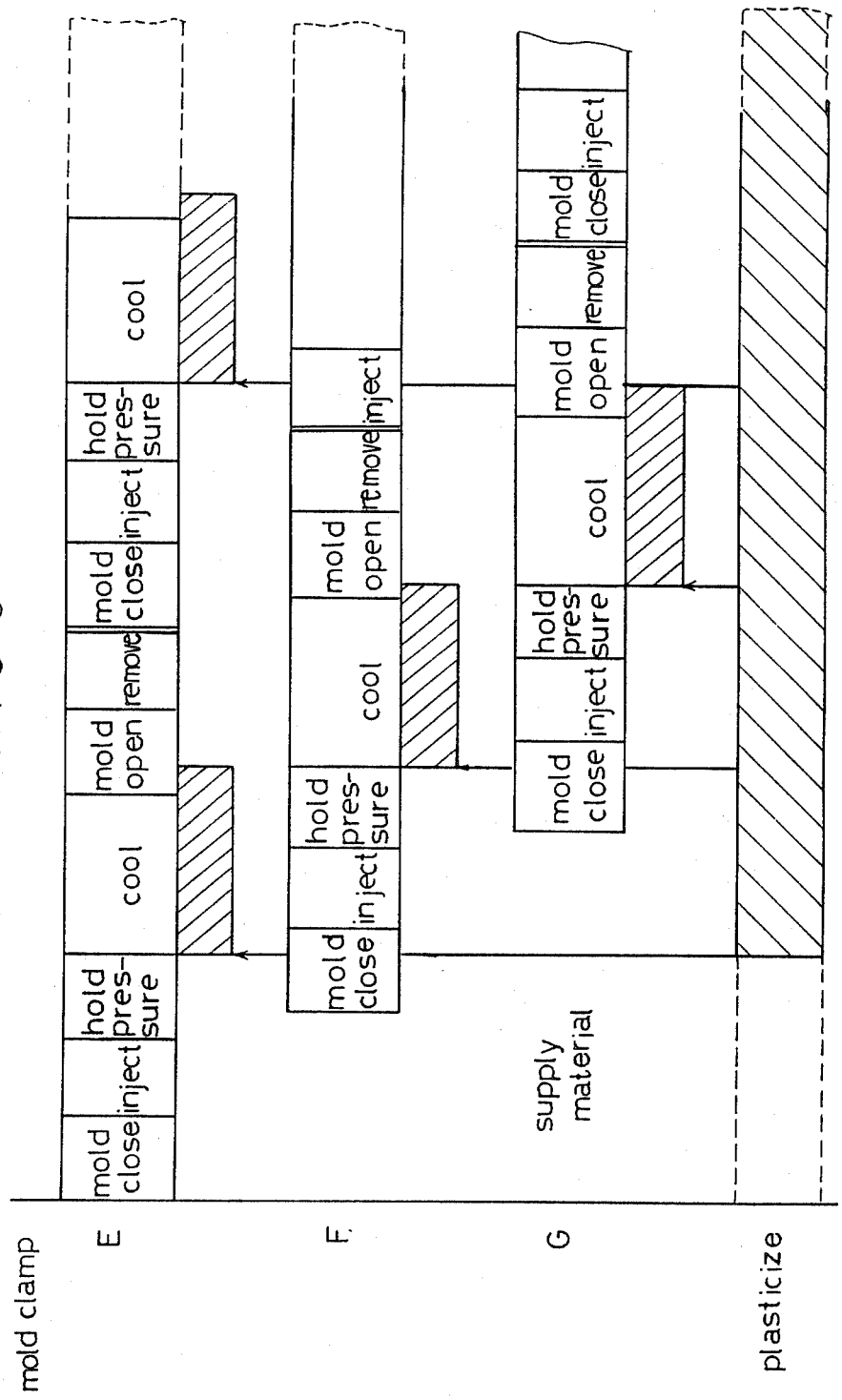

INJECTION MOLDING MACHINE AND METHOD

BACKGROUND OF THE INVENTION

1. Field of the Invention

This invention relates to an injection molding machine, and method and more particularly to an injection molding machine and method for plastics and other similar materials having a high degree of working efficiency.

2. Discussion of the Background

Conventional injection molding machines comprise a plurality of parallel mold clamping devices, and a single movable injection device which travels along guide rails to effect injection, a pressure holding process and plasticization in regular sequence for each of the mold clamping devices.

As shown in FIG. 4, one type of this known injection molding machine comprises a movable injection device 10, two parallel guide rails 11, and three mold clamping devices 12, 13 and 14 which are stationary. As the injection device 10 travels along the guide rails 11, injection, a pressure holding process and plasticization are sequentially effected for the mold clamping devices 12, 13 and 14.

According to this known system, the movable injection device 10 injects plasticized material into the first mold clamping device 12. Immediately after injection and pressure holding process have been effected for the first mold clamping device 12, the injection device 10 starts to move to the second mold clamping device 13 while effecting plasticization.

FIG. 5 is a flow chart illustrating working processes at the respective mold clamping devices 12, 13 and 14. That is, as shown in FIG. 5, an injection molding cycle comprises the steps of closing a mold, injecting, holding pressure, cooling, opening a mold and removing a molded article.

This known injection molding system, however, has the following disadvantages. The movable injection device is not capable of starting plasticization of material for the subsequent shot until a pressure holding process for one mold clamping device is completed. Also, a large amount of starting energy or power, costly fixed equipment as well as a large space for machine installation are required to allow the injection device to make reciprocal movement along the guide rails in regular sequence.

SUMMARY OF THE INVENTION

Accordingly, it is an object of the present invention to provide a new and improved injection molding machine and method which is free from the disadvantages of the prior art and has advantageous features not possessed by known injection molding machines.

It is another object of the present invention to provide a new and improved injection molding machine and method of the type wherein any consumption of a large starting energy may be avoided, and the cost of fixed equipment and floor space required for machine installation may be remarkably reduced.

It is a further object of the present invention to provide a new and improved injection molding machine and method which insures a higher degree of utilization efficiency of the entire injection molding machine.

It is a still further object of the present invention to provide a new and improved injection molding machine and method which is suitable for mass production.

According to the present invention, an injection molding machine comprises a plasticization device which is of a screw extruder type and plasticizes plastics and any other similar materials, a plurality of injection devices, each including a plunger for injecting plasticized and melted material, a plurality of mold clamping devices corresponding to the respective injection devices, a heat pipe branching at its end into the respective injection devices, a drive device for moving the screw extruder and the plungers, and a control device for controlling the drive device.

That is, this invention features that there is provided an independent plasticization device for exclusive use of effecting a plasticizing process. Accordingly, the plurality of stationary injection devices only function to inject plasticized material into the corresponding mold clamping devices, respectively.

At this point, it is to be noted that the plasticization device is of a screw extruder type, and that each of the injection devices is of a plunger type.

By virtue of this construction, the plasticization device feeds consecutively plasticized material to injection devices, whereby the injection devices can inject such plasticized material into their corresponding mold clamping devices in regular sequence.

As plasticized material is consecutively fed into the injection devices by way of the heat pipe, any shortage of the supply of plasticized material may not occur in any processes for injection molding. In addition, it is expected that a higher utilization efficiency of the entire injection molding system is attained because plasticization is consecutively effected in parallel with other processes such as injection, a pressure holding process and cooling.

Furthermore, the gist of the present invention resides in that there are provided gate valves one each at an injection nozzle and at an inflow nozzle of the injection devices, respectively. These gate valves control a sequential operation of receiving and injecting plasticized material in the injection devices.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3 is a flow chart illustrating processes according to one embodiment of the present invention;

DESCRIPTION OF THE PREFERRED EMBODIMENTS

Figure 1:
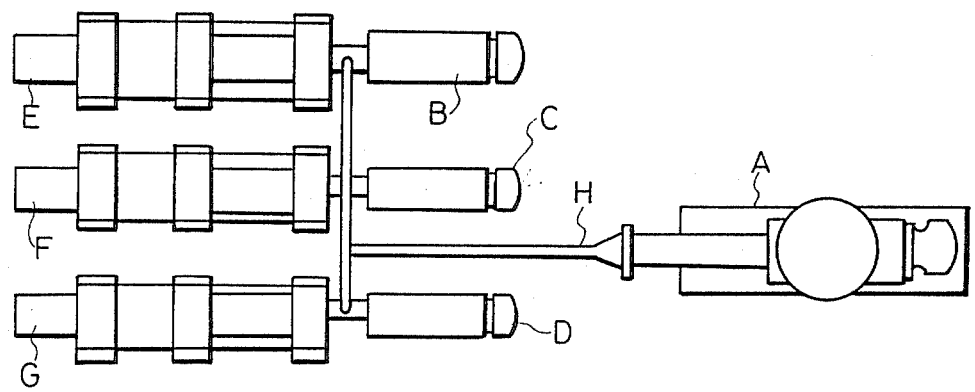
FIG. 1 is a schematic illustration of the construction of the machine of one embodiment of the present invention.

Various other objects, features and attendant advantages of the present invention will be more fully appreciated as the same becomes better understood from the following detailed description when considered in connection with the accompanying drawings in which like reference characters designate like or corresponding parts throughout the several views and wherein a basic construction of the machine utilized in one embodiment of the present invention is presented in FIG. 1.

An injection molding machine in accordance with the present invention includes a plasticization device A of a screw extruder type, a plurality of injection devices B, C and D of a plunger type, a plurality of mold clamping devices E, F and G corresponding to the respective injection devices B, C and D, and a heat pipe H branching at its end into the respective injection devices B, C and D to transfer plasticized resin supplied from the plasticization device A. In addition to these structural components, a drive device (not shown) for moving the screw extruder and the plungers, and a control device (not shown) for controlling the drive device are provided.

The heat pipe H communicates the plasticization device A to each of the injection devices B, C and D, so that plasticized resin may be fed from the plasticization device A to the respective injection devices B, C and D in regular sequence.

Figure 2:
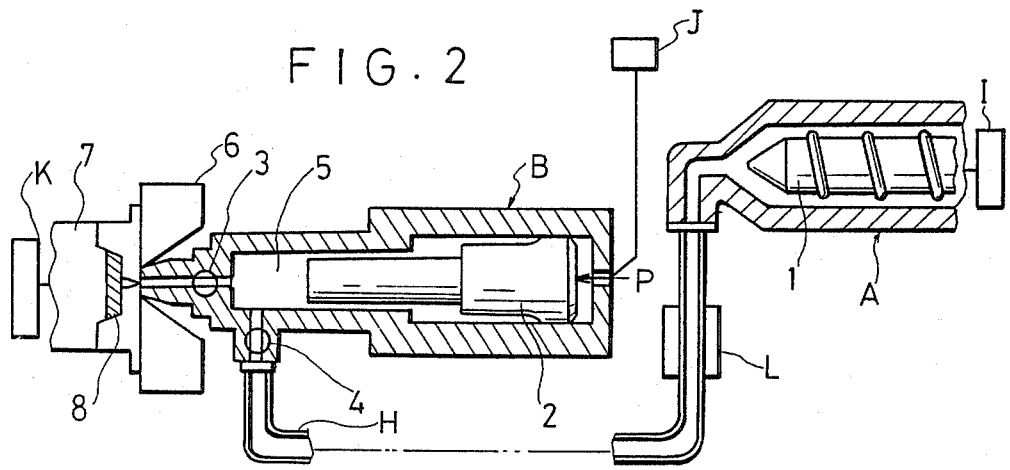
FIG. 2 is an enlarged cross sectional view of essential parts of the present invention.
Figure 4:
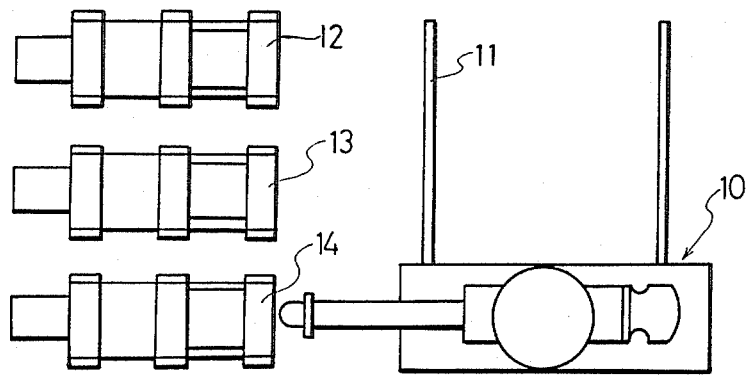
FIG. 4 is a schematic illustration of the construction of a conventional injection molding machine.
Figure 5:
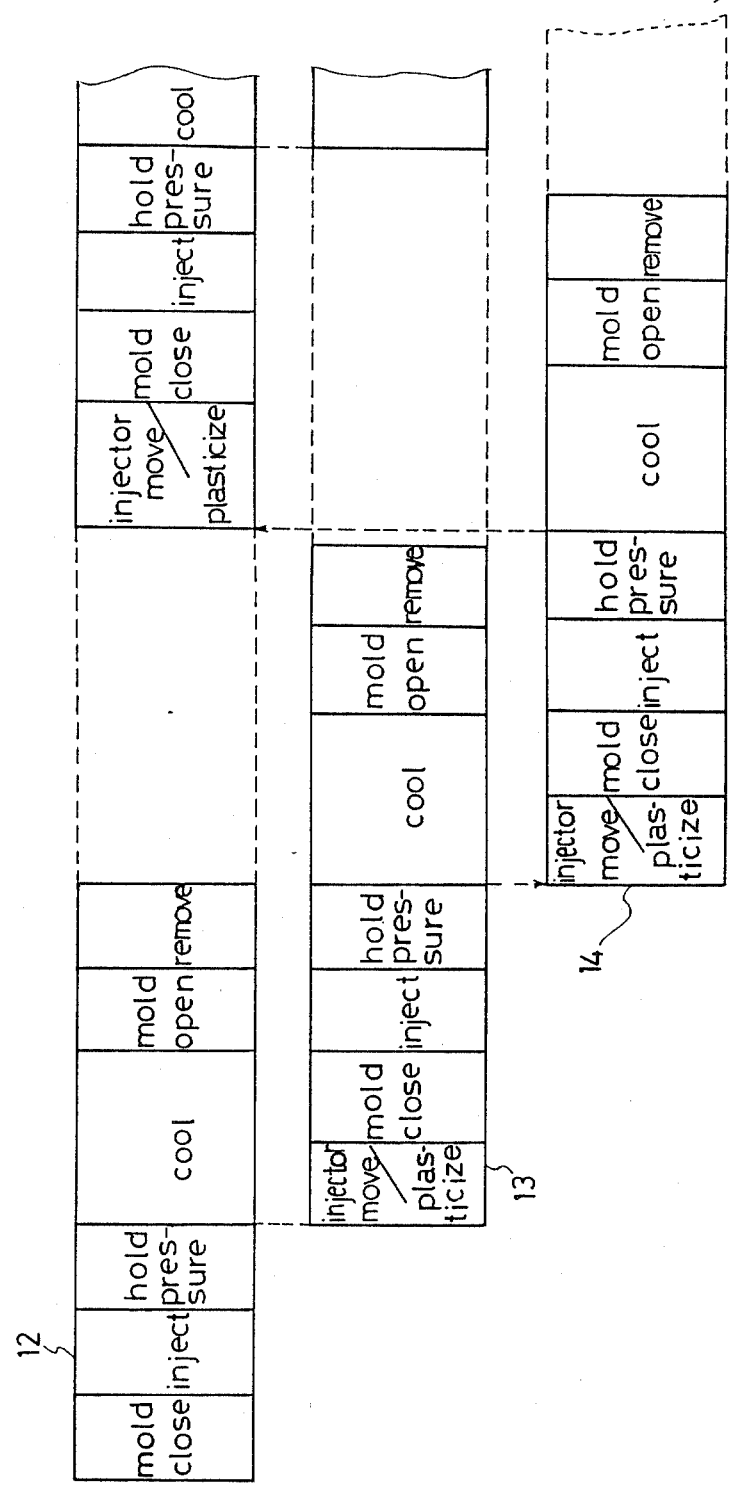
FIG. 5 is a flow chart illustrating processes according to the conventional machine.

As shown in FIG. 2, the plasticization device A has the screw type extruder 1. Inside a cylinder 5 of each of the injection devices B, C, and D, a plunger 2 is provided for reciprocation to inject plasticized material into the corresponding mold clamping devices, respectively. Also provided in the injection devices B, C and D are a first gate valve 3 and a second gate valve 4.

The first gate valve 3 is provided at an injection nozzle portion and the second gate valve 4 at an inflow nozzle portion, of the respective injection devices B, C and D.

The injection nozzle portion 6 of each of the injection devices B, C and D is combined with a fixed mold head of the corresponding one of the mold clamping devices E, F and G. The numeral 7 denotes a mold and the numeral 8, a cavity, respectively.

With this construction, plasticized resin from the plasticization device A is sequentially fed into the respective injection devices B, C and D by way of the heat pipe H which is heated by a heater (or the like) (not shown).

As soon as plasticized resin is supplied to the injection device B, the first gate valve 3 is opened, while the second gate valve 4 is closed by operation of a valve actuating device (not shown).

Thus, a cylinder 5 of the injection device B is filled with plasticized resin. Then, the plunger 2 is moved forward (to the left) by oil pressure, whereby injection of plasticized resin into the cavity 8 of the mold 7 is effected. This injection process is followed by the subsequent pressure holding process.

In the pressure holding process, the first gate valve 3 remains open and the second gate valve 4 remains closed in order to maintain the mold section in a pressure held condition for a predetermined time.

Simultaneously with completion of the pressure holding process and starting of a cooling process, the first gate valve 3 is closed while the second gate valve 4 is opened to receive the supply of a new plasticized resin from the plasticization device A. At this time, the plunger 2 is retracted to its original starting position by hydraulic pressure of resin. It is possible to control the injecting amount of melted resin by adjusting the travel distance of the plunger 2.

The second gate valve 4 is closed immediately after the supply of plasticized resin is completed. When the subsequent injecting process is started, gate valve 3 is opened.

This embodiment features that plasticization is continuously conducted by the plasticization device A during the injection molding process, and that plasticized resin is supplied into the respective injection devices B, C and D by operation of the second gate valve 4 in regular sequence.

FIG. 3 is a flow chart illustrating a sequential operation of the respective injection devices B, C and D and mold clamping devices E, F and G. As shown in FIG. 3, processes of closing a mold, injecting, holding pressure, cooling, opening a mold and removing a molded article are effected in regular sequence.

As indicated by oblique lines in FIG. 3, when the mold clamping device E is at the stage of cooling, plasticized resin is injected into the cavity of the mold clamping device F. In like manner, when the mold clamping device F is at the stage of cooling, plasticized resin is injected into the cavity of the mold clamping device G. I designates a mechanism for driving plasticization device A, J indicates fluid operated means for energizing the respective injection devices, and K indicates a mechanism for applying a comprehensive force of respective mold clamping. L shows a heater for heat pipe H. By repeating these cyclic processes, a molded article is produced on a mass production basis. As is apparent from the aforementioned description, the injection molding machine of this invention makes it possible to reduce time between successive processes by feeding consecutively plasticized resin to the respective injection devices from the exclusive plasticizing source.

This arrangement may avoid any possibility of shortage of the supply of plasticized resin during the injection molding process. In short, the present invention contributes to improving the operation ratio of the injection and clamping sections, resulting in a higher utilization efficiency of the entire injection molding machine. In addition, in the case of this invention, injection devices are stationary, so that a total kinetic energy consumption, cost of fixed equipment as well as space for machine installation may be remarkably reduced, as compared with those of the known art.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An injection molding process, utilizing a stationary plasticizing device having a screw extruder; a plurality of parallel stationary injection devices each respectively having an openable and closable first valve at an injection nozzle and an openable and closable secons valve at an inflow inlet and having a plunger for injecting plasticized material; a plurality of spaced, parallel molds aligned with the respective injection devices; and a pipe having heating means including branches connected to the inflow inlets of the respective injection devices; wherein said method comprises the steps of:
   driving said screw extruder;
   applying compressive forces to the respective molds;
   closing said first valves and opening said second valves of said injection devices;

supplying said plasticized material from said plasticization device to said injection devices;

opening said first valves and closing said second valves; and shifting said plungers as to supply said plasticized material to said molds.

2. An injection molding machine, comprising:

a stationary platicization device having a screw extruder, for plasticizing plastics and any other similar materials and for extruding plasticized material continuously;

a plurality of parallel stationary injection devices each respectively having an openable and closable first valve at an injection nozzle and an openable and closable second valve at an inflow inlet and having a plunger for injection plasticized material;

a plurality of spaced parallel molds aligned with the respective injection devices;

a pipe having heating means including branches connected to said inflow inlets of said respective injection devices to transfer plasticized material supplied from said plasticization device;

means for driving said screw extruder;

fluid operated means for energizing said respective injection plungers and;

means for applying compressive forces to said respective molds;

whereby said first valve is closed and said second valve is opened during the time when said plasticized material is supplied from said plasticization device, respectively; and said first valve is opened and said second valve is closed except during said time when said plasticized material is supplied from said plasticization device.

3. A injection molding machine according to claim 2, wherein each said plunger reciprocates between a first advanced position and a second retracted position by oil pressure means.

* * * * *